United States Patent
Lin et al.

(10) Patent No.: US 10,909,348 B2
(45) Date of Patent: Feb. 2, 2021

(54) OPTICAL FINGERPRINT SENSING DEVICE AND OPERATION METHOD THEREOF

(71) Applicant: Novatek Microelectronics Corp., Hsinchu (TW)

(72) Inventors: Li-Wei Lin, Hsinchu (TW); Ding-Teng Shih, Taoyuan (TW); Fan-Wei Kuo, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/396,756

(22) Filed: Apr. 28, 2019

(65) Prior Publication Data
US 2020/0342203 A1 Oct. 29, 2020

(51) Int. Cl.
*G06K 9/00* (2006.01)
*G06K 9/03* (2006.01)

(52) U.S. Cl.
CPC ..... *G06K 9/00087* (2013.01); *G06K 9/00026* (2013.01); *G06K 9/03* (2013.01)

(58) Field of Classification Search
CPC ... G06K 9/00087; G06K 9/03; G06K 9/00026
See application file for complete search history.

(56) References Cited

U.S. PATENT DOCUMENTS

| | | | | |
|---|---|---|---|---|
| 6,289,114 B1* | 9/2001 | Mainguet | ........... | G06K 9/00026 382/124 |
| 2013/0259330 A1* | 10/2013 | Russo | ................ | G06K 9/00013 382/124 |
| 2014/0003681 A1* | 1/2014 | Wright | ............... | G06K 9/00026 382/124 |

* cited by examiner

*Primary Examiner* — Abhishek Sarma
(74) *Attorney, Agent, or Firm* — JCIPRNET

(57) ABSTRACT

An optical fingerprint sensing device and an operation method thereof are provided. The optical fingerprint sensing device includes an optical fingerprint sensing circuit, an image superimposing circuit and a fingerprint matching circuit. The optical fingerprint sensing circuit is configured to capture an original image of the fingerprint. The image superimposing circuit is coupled to the optical fingerprint sensing circuit. The image superimposing circuit is configured to collect the original image of the fingerprint to obtain a plurality of original fingerprint images. The image superimposing circuit superimposes the original fingerprint images according to at least one superimposition parameter to obtain a superimposed fingerprint image. The fingerprint matching circuit is coupled to the image superimposing circuit to receive the superimposed fingerprint image. The fingerprint matching circuit performs fingerprint matching on the superimposed fingerprint image.

16 Claims, 3 Drawing Sheets

OPTICAL FINGERPRINT SENSING DEVICE AND OPERATION METHOD THEREOF

BACKGROUND

Field of the Invention

The invention relates to a fingerprint sensing device and more particularly to an optical fingerprint sensing device and an operation method thereof.

Description of Related Art

In recent years, demands for fingerprint sensing have been gradually increased. In order to reduce a volume of a display apparatus, a fingerprint sensing region may overlap with a display region of the display apparatus. For example, an under-display fingerprint recognition technique is to dispose/attach a fingerprint sensor beneath (on a back surface of) a display panel, and the fingerprint sensor may sense/capture a fingerprint image through the display panel. Due to the limitation in a transmittance capability of a capacitive sensor, the under-display fingerprint recognition technique adopts an optical imaging or optical sensing technique. Based on a design requirement for further reducing a thickness of the display apparatus, an in-display fingerprint recognition technique is accordingly developed. Different from the under-display fingerprint recognition technique, the in-display fingerprint recognition technique is to embed a fingerprint sensor array in the display panel. Namely, the display panel with the in-display fingerprint recognition capability has a pixel circuit array and an in-display fingerprint sensor array.

In a first press and/or in an unfavorable environment (e.g., a low-temperature environment, a dry-finger and/or a bright-light environment), it is easy to obtain a blur image through the optical fingerprint sensing, which may result in failure to the recognition of the fingerprint image. Since the fingerprint has a time period of press stabilization during the process of the press, the fingerprint image sensed (captured) when the fingerprint is instable easily tends to have an issue of poor image quality. In order to improve a matching success rate without affecting a user's experience, a conventional technique uses a failure-to-recapture comparing mechanism to reduce a false rejection rate (FRR). The "failure-to-recapture" refers to, if recognition (matching) of a first fingerprint image fails, dropping the first fingerprint image to re-sense (recapture) a second fingerprint image and then, performing recognition (matching) on the second fingerprint image. Generally, the use of the failure-to-recapture comparing mechanism in the unfavorable environment cannot obtain sufficient benefit.

It should be noted that the contents of the section of "Description of Related Art" is used for facilitating the understanding of the invention. A part of the contents (or all of the contents) disclosed in the section of "Description of Related Art" may not pertain to the conventional technology known to the persons with ordinary skilled in the art. The contents disclosed in the section of "Description of Related Art" do not represent that the contents have been known to the persons with ordinary skilled in the art prior to the filing of this invention application.

SUMMARY

The invention provides an optical fingerprint sensing device and an operation method thereof to enhance a matching success rate.

According to an embodiment of the invention, an optical fingerprint sensing device is provided. The optical fingerprint sensing device includes an optical fingerprint sensing circuit, an image superimposing circuit and a fingerprint matching circuit. The optical fingerprint sensing circuit is configured to capture an original image of the fingerprint. The image superimposing circuit is coupled to the optical fingerprint sensing circuit. The image superimposing circuit is configured to collect the original image of the fingerprint to obtain a plurality of original fingerprint images. The image superimposing circuit superimposes the original fingerprint images according to at least one superimposition parameter to obtain a superimposed fingerprint image. The fingerprint matching circuit is coupled to the image superimposing circuit to receive the superimposed fingerprint image. The fingerprint matching circuit performs fingerprint matching on the superimposed fingerprint image.

According to an embodiment of the invention, an operation method of an optical fingerprint sensing device is provided. The operation method includes: capturing an original image of a fingerprint by an optical fingerprint sensing circuit; collecting the original image of the fingerprint to obtain a plurality of original fingerprint images by an image superimposing circuit; superimposing the original fingerprint images according to at least one superimposition parameter to obtain a superimposed fingerprint image by the image superimposing circuit; and performing fingerprint matching on the superimposed fingerprint image by a fingerprint matching circuit.

To sum up, the optical fingerprint sensing device and the operation method thereof provided by the embodiments of the invention can obtain the plurality of original fingerprint images by capturing the same fingerprint for multiple times. The image superimposing circuit superimposes the original fingerprint images to obtain the superimposed fingerprint image. The fingerprint matching circuit performs the fingerprint matching on the superimposed fingerprint image to enhance the matching success rate.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
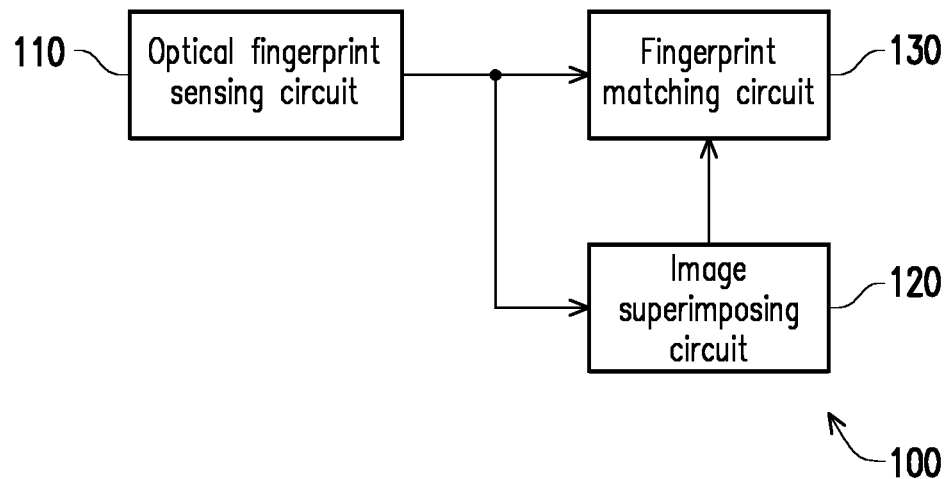
FIG. 1 is a schematic circuit block diagram illustrating an optical fingerprint sensing device according to an embodiment of the invention.

The term "couple (or connect)" throughout the specification (including the claims) of this application are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. In addition, terms such as "first" and "second" mentioned throughout the specification (including the claims) of this application are only for naming the names of the elements or distinguishing different embodiments or scopes and are not intended to limit the upper limit or the lower limit of the number of the elements not intended to limit sequences of the elements. Moreover, elements/components/steps with same reference numerals represent same or similar parts in the drawings and embodiments. Elements/components/notations with the same reference numerals in different embodiments may be referenced to the related description.

FIG. 1 is a schematic circuit block diagram illustrating an optical fingerprint sensing device 100 according to an embodiment of the invention. In the embodiment illustrated in FIG. 1, the optical fingerprint sensing device 100 includes an optical fingerprint sensing circuit 110, an image superimposing circuit 120 and a fingerprint matching circuit 130. The optical fingerprint sensing circuit 110 may capture an original image of a fingerprint. The implementation manner of the optical fingerprint sensing circuit 110 is not limited in the present embodiment. Based on a design requirement, the optical fingerprint sensing circuit 110 may include a fingerprint sensor using an under-display fingerprint recognition technique, a fingerprint sensor using an in-display fingerprint or other types of fingerprint sensors. For instance, in some embodiments, the optical fingerprint sensing circuit 110 may include a conventional optical fingerprint sensor.

The image superimposing circuit 120 is coupled to the optical fingerprint sensing circuit 110. The image superimposing circuit 120 may collect the original image of the fingerprint provided by the optical fingerprint sensing circuit 110 to obtain a plurality of original fingerprint images. The image superimposing circuit 120 may superimpose the original fingerprint images according to at least one superimposition parameter to obtain a superimposed fingerprint image. The implementation manner of the image superimposing circuit 120 is not limited in the present embodiment. For example, based on a design requirement, the image superimposing circuit 120 may superpose the original fingerprint images in a manner of "averaging pixel values of a same position in different images", superpose the original fingerprint images in a manner of "averaging the pixel values of the same position in different images according to a superimposition weight", or superpose the original fingerprint images by using other superposition algorithms. In some other embodiments, the image superimposing circuit 120 may superpose the original fingerprint images by using a conventional superposition algorithm. Based on a design requirement, the at least one superimposition parameter may include at least one of the number of fingerprint capture times, the number of superposition times (the number of the images to be superimposed), a superimposition weight and other superimposition parameters.

The fingerprint matching circuit 130 is coupled to the image superimposing circuit 120 to receive the superimposed fingerprint image. The fingerprint matching circuit 130 may perform fingerprint matching on the superimposed fingerprint image. The implementation manner of the fingerprint matching circuit 130 is not limited in the present embodiment. For instance, based on a design requirement, the fingerprint matching circuit 130 may perform the fingerprint matching on the superimposed fingerprint image by using a conventional fingerprint matching algorithm or other fingerprint matching algorithms.

Figure 2:
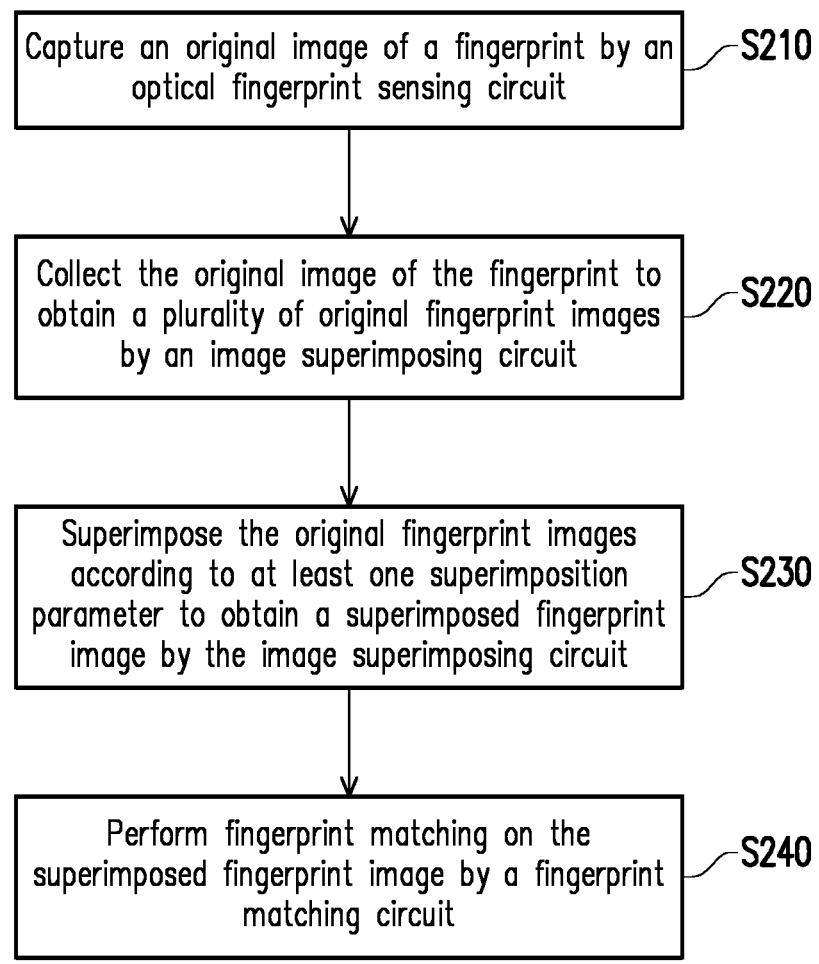
FIG. 2 is a flowchart illustrating an operation method of an optical fingerprint sensing device according to an embodiment of the invention.

FIG. 2 is a flowchart illustrating an operation method of an optical fingerprint sensing device according to an embodiment of the invention. Referring to FIG. 1 and FIG. 2, in step S210, the optical fingerprint sensing circuit 110 may capture an original image of a fingerprint. In step S220, the image superimposing circuit 120 may collect the original image of the fingerprint to obtain a plurality of original fingerprint images. In step S230, the image superimposing circuit 120 may superimpose the original fingerprint images according to at least one superimposition parameter to obtain a superimposed fingerprint image. In step S240, the fingerprint matching circuit 130 may perform fingerprint matching on the superimposed fingerprint image.

For instance, when a user presses on the optical fingerprint sensing circuit 110 with a finger in a dry low-temperature environment (for example, Beijing in winter), the original image of the fingerprint captured by the optical fingerprint sensing circuit 110 is usually a fingerprint image with unclear fingerprint features (due to the dry low-temperature environment), which results in failure of the fingerprint matching. In the present embodiment, the optical fingerprint sensing circuit 110 may capture the fingerprint of the same finger for multiple times to provide the original fingerprint images to the image superimposing circuit 120. The image superimposing circuit 120 may superimpose the original fingerprint images according to the at least one superimposition parameter to obtain a superimposed fingerprint image. The superposed fingerprint image has higher quality than the original image of the fingerprint (which is the fingerprint image obtained in single capture), and thus, the fingerprint matching circuit 130 may have opportunity to obtain more fingerprint information (fingerprint features) from the superimposed fingerprint image to increase a matching success rate.

Figure 3:
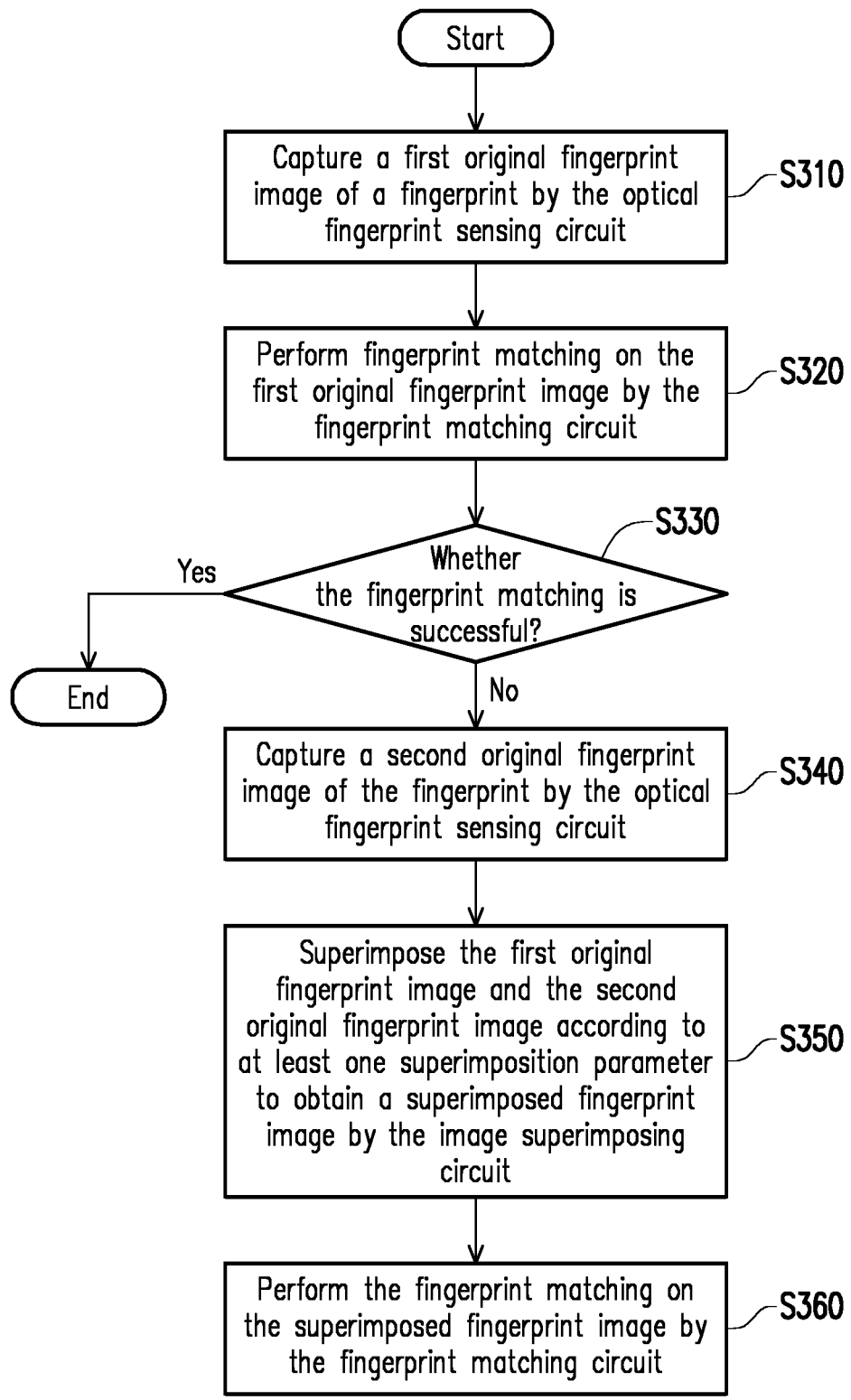
FIG. 3 is a flowchart illustrating an operation method of an optical fingerprint sensing device according to another embodiment of the invention.

FIG. 3 is a flowchart illustrating an operation method of an optical fingerprint sensing device according to another embodiment of the invention. Referring to FIG. 1 and FIG. 3, in step S310, the optical fingerprint sensing circuit 110 may capture an original image of a fingerprint (i.e., a first original fingerprint image). The fingerprint matching circuit 130 is coupled to the optical fingerprint sensing circuit 110 to receive the original image of the fingerprint. In step S320, the fingerprint matching circuit 130 may perform fingerprint matching on the first original fingerprint image. When a result of the fingerprint matching is successful (i.e., the result of step S330 is "Yes"), the current fingerprint matching may end.

When a result that the fingerprint matching circuit 130 performs the fingerprint matching on the first original fingerprint image is failed (i.e., the result of step S330 is "No"), the optical fingerprint sensing circuit 110 may again capture another fingerprint image (i.e., a second original fingerprint image) of the same finger in step S340. Namely, the image superimposing circuit 120 may collect the first original fingerprint image and the second original fingerprint image. In step S350, the image superimposing circuit 120 may superimpose the first original fingerprint image and the second original fingerprint image according to the at least one superimposition parameter to obtain a superimposed fingerprint image. In step S360, the fingerprint matching circuit 130 may perform the fingerprint matching on the superimposed fingerprint image.

For instance, the optical fingerprint sensing circuit 110 may capture a fingerprint of a finger to provide a first original fingerprint image A1 to the image superimposing circuit 120 and the fingerprint matching circuit 130. After the fingerprint matching circuit 130 performs the fingerprint matching on the first original fingerprint image A1 and fails, the optical fingerprint sensing circuit 110 may capture the fingerprint of the same finger for the second time to provide a second original fingerprint image A2 to the image superimposing circuit 120. The image superimposing circuit 120 may superimpose the first original fingerprint image and the second original fingerprint image according to the at least one superimposition parameter to obtain a superimposed fingerprint image B2 and provide the superimposed fingerprint image B2 to the fingerprint matching circuit 130. After the fingerprint matching circuit 130 performs the fingerprint matching on the superimposed fingerprint image B2 and still fails, the optical fingerprint sensing circuit 110 may capture the fingerprint of the same finger for the third time to provide a third original fingerprint image A3 to the image superimposing circuit 120. The image superimposing circuit 120 may superimpose the superimposed fingerprint image B2 and the third original fingerprint image A3 according to the at least one superimposition parameter to obtain another superimposed fingerprint image B3 and provide the superimposed fingerprint image B3 to the fingerprint matching circuit 130. The fingerprint matching circuit 130 may perform the fingerprint matching on the superimposed fingerprint image, and so repeat in the same way, until the recognition reaches an upper limit of times or reaches an upper limit of a time length, or the fingerprint matching is successful. The quality of the superimposed fingerprint image B2 is higher than that of the first original fingerprint image A1 and that of the second original fingerprint image A2, the quality of the superimposed fingerprint image B3 is higher than that of the second original fingerprint image A2 and that of the third original fingerprint image A3, and thus, the fingerprint matching circuit 130 may have opportunity to obtain more fingerprint information (fingerprint features) from the superimposed fingerprint images to increase a matching success rate.

Figure 4:
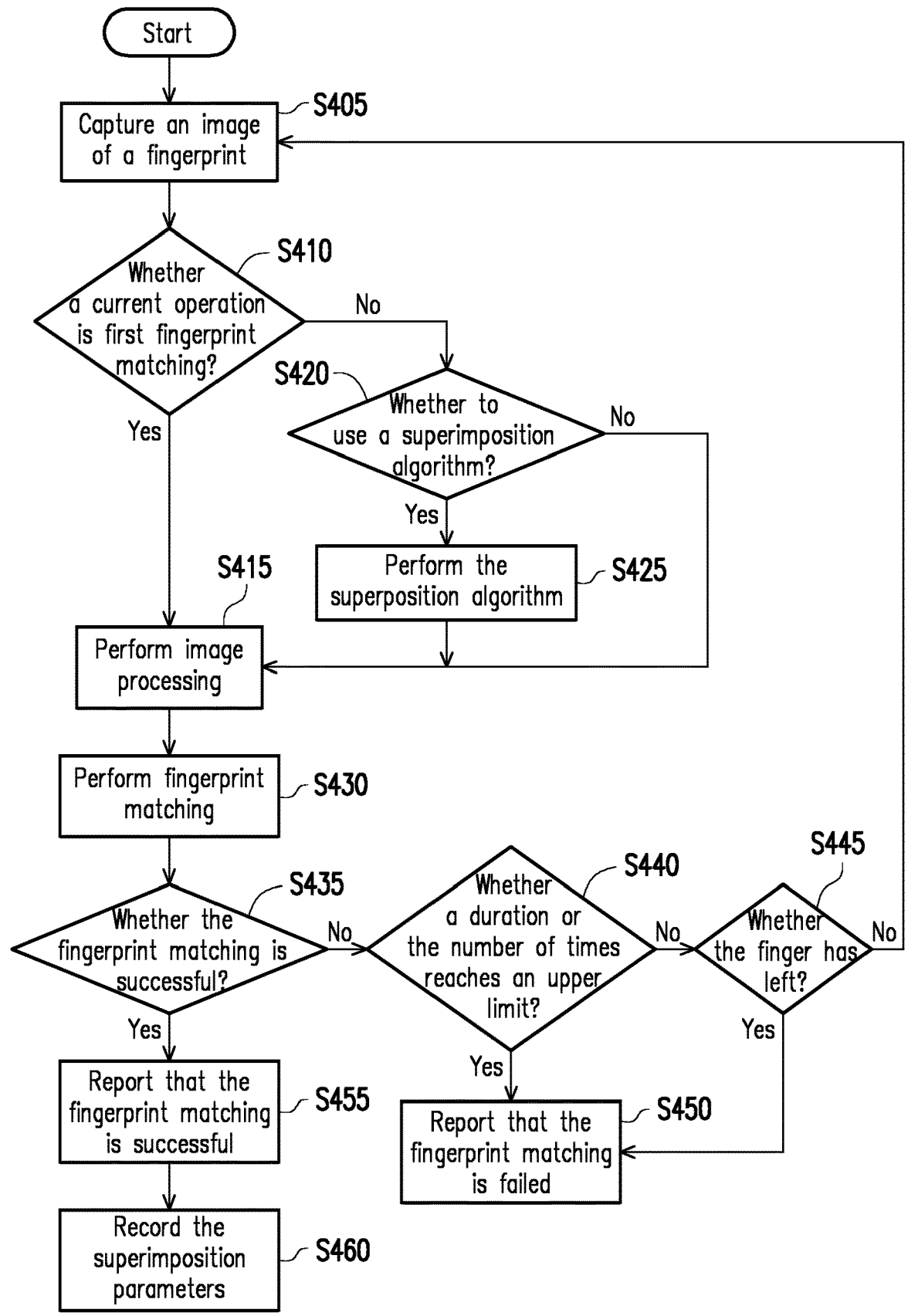
FIG. 4 is a flowchart illustrating an operation method of an optical fingerprint sensing device according to yet another embodiment of the invention.

FIG. 4 is a flowchart illustrating an operation method of an optical fingerprint sensing device according to yet another embodiment of the invention. Referring to FIG. 1 and FIG. 4, in step S405, the optical fingerprint sensing circuit 110 may capture an original image of a fingerprint. In step S410, the fingerprint matching circuit 130 may determine whether a current operation is first fingerprint matching, namely, determine whether the image superimposing circuit collects more than one original fingerprint images. If the current operation is the first fingerprint matching (the determination result of step S410 is "Yes"), the image superimposing circuit 120 may, in step S415, perform image processing (e.g., denoising) on the original image provided by the optical fingerprint matching circuit 110 to reinforce the fingerprint features. The manner of the image processing performed by the fingerprint matching circuit 130 is not limited in the present embodiment. For instance, based on a design requirement, the fingerprint matching circuit 130 may perform fingerprint matching on the original image provided by the optical fingerprint sensing circuit 110 by using a conventional image processing algorithm or other image processing algorithms.

If the current operation is not the first fingerprint matching (the determination result of step S410 is "No"), the fingerprint matching circuit 130 may perform step S420. In step S420, the fingerprint matching circuit 130 may determine whether to trigger the image superimposing circuit 120, namely, determine whether to use a superposition algorithm. For example, the fingerprint matching circuit 130 may calculate a difference (e.g. difference degree) between a currently captured fingerprint and a previously captured fingerprint, and determine whether the difference is greater than a threshold. If the difference is greater than the threshold (the determination result of step S420 is "No"), the image superimposing circuit 120 is not triggered (i.e., the superposition algorithm is not used), and the method proceeds to step S415. The fingerprint sensing circuit 130 may, in step S415, perform the image processing (e.g., denoising) on the original image (which is the currently captured original fingerprint image) provided by the optical fingerprint matching circuit 110 to reinforce the fingerprint features.

If the difference is not greater than the threshold (the determination result of step S420 is "Yes"), i.e. the currently captured fingerprint is similar to the previously captured fingerprint, the fingerprint matching circuit 130 may perform step S425. In step S425, the fingerprint matching circuit 130 may trigger the image superimposing circuit 120, so as to superpose the original fingerprint images by using the superposition algorithm. For example, it is assumed that the optical fingerprint sensing circuit 110 previously captures the first original fingerprint image A1 (but the result of the fingerprint matching is failed) and currently captures the second original fingerprint image A2. The image superimposing circuit 120 may, in step S425, superimpose the first original fingerprint image A1 and the second original fingerprint image A2 according to at least one superimposition parameter to obtain a superimposed fingerprint image B2 and provide the superimposed fingerprint image B2 to the fingerprint matching circuit 130. In another example, it is assumed that the result of the previous fingerprint matching (performed on the superimposed fingerprint image B2) by the optical fingerprint sensing circuit 110 is failed, and the optical fingerprint sensing circuit 110 currently captures the third original fingerprint image A3. The image superimposing circuit 120 may, in step S425, superimpose the superimposed fingerprint image B2 and the third original fingerprint image A3 according to the at least one superimposition parameter to obtain another superimposed fingerprint image B3 and provide the superimposed fingerprint image B3 to the fingerprint matching circuit 130. After step S425 is completed, the fingerprint matching circuit 130 may perform step S415. Namely, the fingerprint sensing circuit 130 may, in step S415, perform the image processing on the superimposed fingerprint image provided by the optical fingerprint matching circuit 120 to reinforce the fingerprint features.

The fingerprint sensing circuit 130 may, in step S415, perform the image processing to obtain a processed image. In step S430, the fingerprint matching circuit 130 may perform fingerprint matching on the processed image. When a result that the fingerprint matching circuit 130 performs the fingerprint matching on the processed image is failed (the determination result of step S435 is "No"), the fingerprint matching circuit 130 may perform step S440. In step S440, the fingerprint matching circuit 130 may determine whether a duration of performing the fingerprint matching reaches an upper limit and determine whether the number of times of performing the fingerprint matching reaches an upper limit. The upper limit of the duration and the upper limit of the number of times may be determined based on a design requirement. When the duration of performing the fingerprint matching does not reach the upper limit and the number of times of performing the fingerprint matching does not reach the upper limit (the determination result of step S440 is "No"), the fingerprint matching circuit 130 may perform step S445. In step S445, the fingerprint matching circuit 130 may determine whether the finger has left the optical fingerprint sensing circuit 110. When the finger does not leave the optical fingerprint sensing circuit 110 (the determination result of step S445 is "No"), the fingerprint matching circuit 130 may perform step S405 to trigger the optical fingerprint sensing circuit 110 to again capture another fingerprint image of the same finger.

When the duration of performing the fingerprint matching reaches the upper limit or the number of times of performing the fingerprint matching reaches the upper limit (the determination result of step S440 is "Yes"), or when the finger has left the optical fingerprint sensing circuit 110 (the determination result of step S445 is "Yes"), the fingerprint matching circuit 130 may perform step S450. In step S450, the fingerprint matching circuit 130 may report to a system that "the fingerprint matching is failed", and the current fingerprint matching may end.

When a result of the fingerprint matching is successful (the determination result of step S435 is "Yes"), the fingerprint matching circuit 130 may perform step S455. In step S455, the fingerprint matching circuit 130 may report to the system that "the fingerprint matching is successful", and the current fingerprint matching may end. After the fingerprint matching is successful, the fingerprint matching circuit 130 may, in step S460, record the at least one superimposition parameter corresponding to the superimposed fingerprint image which is successful in the current fingerprint matching in a storage module (for example, a memory or a storage device, which is not shown) for being used in the fingerprint matching next time.

For example, in the previous time, after the fingerprint matching operation of steps S405 to S445, the fingerprint sensing circuit 130 may acquire that the superimposed fingerprint image obtained by superimposing N original fingerprint images may succeed in the fingerprint matching. The "N original fingerprint images" may serve as the superimposition parameters and be recorded in the storage module (not shown). Afterwards, when the user again presses on the optical fingerprint sensing circuit 110 with the finger, the fingerprint matching circuit 130 may read the "N original fingerprint images" (i.e., the superimposition parameters) from the storage module (not shown). Based on the superimposition parameters, the fingerprint matching circuit 130 may trigger the image superimposing circuit 110, so as to capture N images of the same finger at different times to obtain the N original fingerprint images. The fingerprint matching circuit 130 may trigger the image superimposing circuit 120, such that the N original fingerprint images may be superposed according to the superimposition parameters to obtain a superimposed fingerprint image on which the fingerprint matching may be successfully performed. Thus, the optical fingerprint sensing device 100 and the operation method thereof provided by the embodiments of the invention can enhance the matching success rate.

In some other embodiments, the fingerprint matching circuit 130 may, in step S460, record the superimposition parameters and environment information corresponding to the superimposed fingerprint image on which the current fingerprint matching is successfully performed in the storage module (not shown) for being used in next fingerprint matching. Based on a design requirement, the environment information includes at least one of a time, a date, a season, an environment luminance, an environment temperature, an environment humidity, global positioning system (GPS) positioning information, an altitude and other environment information. The fingerprint matching circuit 130 may acquire the current environment information and inform the image superimposing circuit 120 of the environment information. The image superimposing circuit 120 may obtain the superimposition parameters from the storage module according to the environment information and then, superpose the original fingerprint images according to the superimposition parameters to obtain a superimposed fingerprint image on which the fingerprint matching may be successfully performed.

For example, according to a current date (or a current season), the image superimposing circuit 120 may obtain the superimposition parameters (for example, the number of fingerprint capture times and/or a superimposition weight) corresponding to the current date (or the current season) from the storage module (not shown). Then, the image superimposing circuit 120 may superpose the original fingerprint images according to the superimposition parameters to obtain a superimposed fingerprint image on which the fingerprint matching may be successfully performed. For example, the image superimposing circuit 120 may use a greater number of superposition times in winter and use a smaller number of superposition times in summer.

Moreover, for example, the image superimposing circuit 120 may infer a current environment luminance according to a luminance of the original image provided by the optical fingerprint sensing circuit 110. Based on a design requirement, the luminance of the original image may be an average value of all pixel values of the original image, a saturation of the original image, a maximum luminance among all the pixel values or a minimum luminance among all the pixel values of the original image. The image superimposing circuit 120 may obtain the superimposition parameters corresponding to the current environment luminance from the storage module (not shown). Then, the image superimposing circuit 120 may superpose the original fingerprint images according to the superimposition parameters to obtain a superimposed fingerprint image on which the fingerprint matching may be successfully performed.

Moreover, for example, the image superimposing circuit 120 may obtain weather statuses, for example, indoors, outdoors, in mountains or on plains, etc. according to the GPS positioning information. The image superimposing circuit 120 may obtain the superimposition parameters corresponding to the current weather status from the storage module (not shown). Then, the image superimposing circuit 120 may superpose the original fingerprint images according to the superimposition parameters to obtain a superimposed fingerprint image on which the fingerprint matching may be successfully performed.

Hereinafter, the operation of the optical fingerprint sensing device 100 is described according to a specific environment condition. It is assumed that the optical fingerprint sensing device 100 is located in a mountain environment (in a cold and dry climate). When the user uses the optical fingerprint sensing device 100 (for example, a handheld phone) in a mountain at an altitude of 1000 meters, the optical fingerprint sensing device 100 detects environment (weather) factors and brighter images. In the consideration that everyone has different finger conditions, an initial value of the number of superposition times is 1, and an initial value of the superposition weight is 0.7. Thus, the image superimposing circuit 120 may superimpose the first original fingerprint image A1 and the second original fingerprint image A2 according to the superimposition parameters to obtain a superimposed fingerprint image B2, wherein the superimposed fingerprint image B2=0.3*A1+0.7*A2. After the image processing is performed on the superimposed fingerprint image B2, the fingerprint matching circuit 130 may adjust the superimposition parameters according to the fingerprint quality after the image processing (for example, if the finger quality is too law, the superimposition weight increasingly adjusted, up to 0.9) until the fingerprint matching is successful. After the fingerprint matching is successful, the number of superposition times and the superimposition weight may be recorded (updated) to the storage module (not shown). The original fingerprint images captured in the mountain or in an area with a dry climate are usually unclear (a fingerprint signal is not obvious). As the duration that the finger affixed to the optical fingerprint sensing circuit 110 becomes longer, the fingerprint signal of the original fingerprint images that are later captured become more and more obvious. Thus, the original fingerprint images that are newly obtained are given greater weights.

It is assumed that when the first fingerprint matching is performed, the optical fingerprint sensing device 100 is located in a plain environment, but in a humid climate (for example, in Taiwan). The optical fingerprint sensing device 100 may detect the GPS positioning information to determine that the environment (the climate) is humid. In the consideration that everyone has different finger conditions, an initial value of the number of superposition times is 1, and an initial value of the superimposition weight is 0.5. Thus, the image superimposing circuit 120 may superimpose the first original fingerprint image A1 and the second original fingerprint image A2 according to the superimposition parameters to obtain a superimposed fingerprint image B2, wherein the superimposed fingerprint image B2=0.5*A1+0.5*A2. After the image processing is performed on the superimposed fingerprint image B2, the fingerprint matching circuit 130 may adjust the superimposition parameters according to the fingerprint quality after the image processing (for example, if the finger quality is too law, the superimposition weight increasingly adjusted, up to 0.9) until the fingerprint matching is successful. After the fingerprint matching is successful, the number of superposition times and the superimposition weight may be recorded (updated) to the storage module (not shown).

It is assumed that when the first fingerprint matching is performed, the optical fingerprint sensing device 100 is located in a plain environment, but in a dry climate. The optical fingerprint sensing device 100 may detect the GPS positioning information to determine that the environment (the climate) is dry. In the consideration that everyone has different finger conditions, an initial value of the number of superposition times is 1, and an initial value of the superimposition weight is 0.6. Thus, the image superimposing circuit 120 may superimpose the first original fingerprint image A1 and the second original fingerprint image A2 according to the superimposition parameters to obtain a superimposed fingerprint image B2, wherein the superimposed fingerprint image B2=0.4*A1+0.6*A2. After the image processing is performed on the superimposed fingerprint image B2, the fingerprint matching circuit 130 may adjust the superimposition parameters according to the fingerprint quality after the image processing (for example, if the finger quality is too law, the superimposition weight increasingly adjusted, up to 0.9) until the fingerprint matching is successful. After the fingerprint matching is successful, the number of superposition times and the superimposition weight may be recorded (updated) to the storage module (not shown).

The optical fingerprint sensing device 100 and the operation method thereof provided by the embodiments of the invention can enhance the matching success rate. It is assumed that the user registers the left and the right thumbs in a normal environment. Thereafter, the user is able to succeed in the fingerprint matching using the left and the right thumbs in a normal condition to successfully operate the optical fingerprint sensing device 100. When the optical fingerprint sensing device 100 is moved to a dry low-temperature environment (for example, in Beijing in winter), the hands of the user are in a dry state (even in a peeling state) due to the environment. If the conventional "failure-to-recapture" comparing mechanism is used, no preferable fingerprint images may be obtained after recapture since the finger image signal is poor due to the dry fingers, which results in failure of fingerprint matching. If the fingerprint sensor device 100 and the operation method thereof provided by the embodiments of the invention are used, in one press of the finger, noise is capable of being effectively reduced to enhance the fingerprint signal through multiple proportional superpositions (weighted superpositions), such that the matching success rate of the finger may be effectively improved.

The optical fingerprint sensing device 100 and the operation method thereof provided by the embodiments of the invention is capable of enhancing the matching success rate under intensive light. For example, if it is assumed that the user again presses the optical fingerprint sensing circuit 110 with the thumb outdoors (under the sun), the sunlight (intensive ambient light) may easily cause overexposure to the images, such that the quality of images captured by the optical fingerprint sensing circuit 110 becomes poor. If the fingerprint sensor device 100 and the operation method thereof provided by the embodiments of the invention are used, an exposure time of the optical fingerprint sensing circuit 110 may be decreasingly adjusted to prevent the images from being overexposed, and the fingerprint signal may be effectively enhanced through multiple superpositions. Thus, the optical fingerprint sensing device 100 and the operation method thereof provided by the embodiments of the invention is capable of enhancing the matching success rate.

It is assumed that the optical fingerprint sensing device 100 uses an organic light emitting diode (OLED) display panel as a light source of the optical fingerprint sensing circuit 110. Generally, a luminance of the OLED slowly decays over time. When the luminance of the OLED is insufficient, the quality of images captured by the optical fingerprint sensing circuit 110 becomes poor. If the conventional "failure-to-recapture" comparing mechanism is used, because the fingerprint image signal is poor due to the insufficient luminance of the OLED, a preferable finger image is still unable to obtain after recapture, which results in the failure of the fingerprint matching. The optical fingerprint sensing device 100 and the operation method thereof provided by the embodiments of the invention are further capable of enhancing the matching success rate by obtaining sufficient fingerprint information in a condition that the OLED has insufficient luminance.

Based on different design demands, the image superimposing circuit 120 and/or the fingerprint matching circuit 130 may be implemented in a form of hardware, firmware, software (i.e., programs) or in a combination of many of the aforementioned three forms.

In terms of the hardware form, the blocks of the image superimposing circuit 120 and/or the fingerprint matching circuit 130 may be implemented in a logic circuit on the integrated circuit. Related functions of the image superimposing circuit 120 and/or the fingerprint matching circuit 130 may be implemented in a form of hardware by utilizing hardware description languages (e.g., Verilog HDL or VHDL) or other suitable programming languages. For example, the related functions of the image superimposing circuit 120 and/or the fingerprint matching circuit 130 may be implemented in one or more controllers, micro-controllers, microprocessors, application-specific integrated circuits (ASICs), digital signal processors (DSPs), field programmable gate arrays (FPGAs) and/or various logic blocks, modules and circuits in other processing units.

In terms of the software form and/or the firmware form, the related functions of the image superimposing circuit 120 and/or the fingerprint matching circuit 130 may be implemented as programming codes. For example, the image superimposing circuit 120 and/or the fingerprint matching circuit 130 may be implemented by using general programming languages (e.g., C or C++) or other suitable programming languages. The programming codes may be recorded/stored in recording media. The aforementioned recording media include a read only memory (ROM), a storage device and/or a random access memory (RAM). Additionally, the programming codes may be accessed from the recording medium and executed by a computer, a central processing unit (CPU), a controller, a micro-controller or a microprocessor to accomplish the related functions. As for the recording medium, a non-transitory computer readable medium, such as a tape, a disk, a card, a semiconductor memory or a programming logic circuit, may be used. In addition, the programs may be provided to the computer (or the CPU) through any transmission medium (e.g., a communication network or radio waves). The communication network is, for example, the Internet, wired communication, wireless communication or other communication media.

Based on the above, the image captured by the optical fingerprint sensing circuit is subject to issues of poor image quality, such as incomplete fingerprint features or weak fingerprint signal. Accordingly, the matching success rate in the condition of the low-temperature environment and a finger or the matching success rate in the outdoors can be enhanced if the image which fails in the fingerprint matching previously is reserved and is superposed with the current image according to different proportions (or the same proportions). The optical fingerprint sensing device and the operation method thereof provided by the embodiments of the invention can obtain the plurality of original fingerprint images by capturing the same fingerprint for multiple times. The image superimposing circuit superimposes the original fingerprint images to obtain the superimposed fingerprint image. The fingerprint matching circuit performs the fingerprint matching on the superimposed fingerprint image to enhance the matching success rate.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An optical fingerprint sensing device, comprising:
an optical fingerprint sensing circuit, configured to capture an original image of a fingerprint;
an image superimposing circuit, coupled to the optical fingerprint sensing circuit, and configured to collect the original image of the fingerprint to obtain a plurality of original fingerprint images, wherein the image superimposing circuit superimposes the original fingerprint images according to at least one superimposition parameter to obtain a superimposed fingerprint image; and
a fingerprint matching circuit, coupled to the image superimposing circuit to receive the superimposed fingerprint image, wherein the fingerprint matching circuit performs fingerprint matching on the superimposed fingerprint image.

2. The optical fingerprint sensing device according to claim 1, wherein
the fingerprint matching circuit is further coupled to the optical fingerprint sensing circuit to receive the original image of the fingerprint; and
when a result that the fingerprint matching circuit performs the fingerprint matching on the original image of the fingerprint is failed, the optical fingerprint sensing circuit again captures another original image of the fingerprint, the image superimposing circuit superimposes the original image and the another original image according to the at least one superimposition parameter to obtain the superimposed fingerprint image, and the fingerprint matching circuit performs the fingerprint matching on the superimposed fingerprint image of the fingerprint.

3. The optical fingerprint sensing device according to claim 2, wherein when a result that the fingerprint matching circuit performs the fingerprint matching on the superimposed fingerprint image of the fingerprint is still failed, the optical fingerprint sensing circuit again captures yet another original image of the fingerprint, the image superimposing circuit superimposes the superimposed fingerprint image and the yet another original image according to the at least one superimposition parameter to obtain another superimposed fingerprint image, and the fingerprint matching circuit performs the fingerprint matching on the another superimposed fingerprint image of the fingerprint.

4. The optical fingerprint sensing device according to claim 2, wherein when a result that the fingerprint matching circuit performs the fingerprint matching on the superimposed fingerprint image of the fingerprint after the optical fingerprint sensing circuit captures the fingerprint for multiple times is successful, the fingerprint matching circuit records the at least one superimposition parameter corresponding to the superimposed fingerprint image into a storage module.

5. The optical fingerprint sensing device according to claim 2, wherein when a result that the fingerprint matching circuit performs the fingerprint matching on the superimposed fingerprint image of the fingerprint after the optical fingerprint sensing circuit captures the fingerprint for multiple times is successful, the fingerprint matching circuit records the at least one superimposition parameter and environment information corresponding to the superimposed fingerprint image into a storage module.

6. The optical fingerprint sensing device according to claim 5, wherein the environment information comprises at least one of a time, a date, a season, an environment luminance, an environment temperature, an environment humidity, GPS positioning information and an altitude.

7. The optical fingerprint sensing device according to claim 1, wherein the at least one superimposition parameter comprises at least one of the number of fingerprint capture times and a superimposition weight.

8. The optical fingerprint sensing device according to claim 1, further comprising:
   a storage module, configured to record the at least one superimposition parameter and environment information,
   wherein the image superimposing circuit obtains the at least one superimposition parameter from the storage module according to the environment information.

9. An operation method of an optical fingerprint sensing device, comprising:
   capturing an original image of a fingerprint by an optical fingerprint sensing circuit;
   collecting the original image of the fingerprint to obtain a plurality of original fingerprint images by an image superimposing circuit;
   superimposing the original fingerprint images according to at least one superimposition parameter to obtain a superimposed fingerprint image by the image superimposing circuit; and
   performing fingerprint matching on the superimposed fingerprint image by a fingerprint matching circuit.

10. The operating method according to the claim 9, further comprising:
    receiving the original image of the fingerprint by the fingerprint matching circuit; and
    when a result that the fingerprint matching circuit performs the fingerprint matching on the original image of the fingerprint is failed, again capturing another original image of the fingerprint by the optical fingerprint sensing circuit, superimposing the original image and the another original image according to the at least one superimposition parameter to obtain the superimposed fingerprint image by the image superimposing circuit, and performing the fingerprint matching on the superimposed fingerprint image of the fingerprint by the fingerprint matching circuit.

11. The operating method according to the claim 10, further comprising:
    when a result that the fingerprint matching circuit performs the fingerprint matching on the superimposed fingerprint image of the fingerprint is still failed, further capturing yet another original image of the fingerprint by the optical fingerprint sensing circuit, superimposing the superimposed fingerprint image and the yet another original image according to the at least one superimposition parameter to obtain another superimposed fingerprint image by the image superimposing circuit, and performing the fingerprint matching on the another superimposed fingerprint image of the fingerprint by the fingerprint matching circuit.

12. The operating method according to the claim 10, further comprising:
    when a result that the fingerprint matching circuit performs the fingerprint matching on the superimposed fingerprint image of the fingerprint after the optical fingerprint sensing circuit captures the fingerprint for multiple times is successful, recording the at least one superimposition parameter corresponding to the superimposed fingerprint image into a storage module by the fingerprint matching circuit.

13. The operating method according to the claim 10, further comprising:
    when a result that the fingerprint matching circuit performs the fingerprint matching on the superimposed fingerprint image of the fingerprint after the optical fingerprint sensing circuit captures the fingerprint for multiple times is successful, recording the at least one superimposition parameter and environment information corresponding to the superimposed fingerprint image into a storage module by the fingerprint matching circuit.

14. The operation method according to claim 13, wherein the environment information comprises at least one of a time, a date, a season, an environment luminance, an environment temperature, an environment humidity, GPS positioning information and an altitude.

15. The operation method according to claim 9, wherein the at least one superimposition parameter comprises at least one of the number of fingerprint capture times and a superimposition weight.

16. The operating method according to the claim 9, further comprising:
    recording the at least one superimposition parameter and environment information by a storage module; and
    obtaining the at least one superimposition parameter from the storage module according to the environment information by the image superimposing circuit.

* * * * *